(12) United States Patent
Jeong et al.

(10) Patent No.: US 10,046,538 B2
(45) Date of Patent: Aug. 14, 2018

(54) COMPOSITE SHEET, METHOD FOR MANUFACTURING SAME, AND DISPLAY DEVICE INCLUDING SAME

(71) Applicant: SAMSUNG SDI CO., LTD., Yongin-si, Gyeonggi-do (KR)

(72) Inventors: Eun Hwan Jeong, Uiwang-si (KR); Woo Jin Lee, Uiwang-si (KR); Sung Kook Kim, Uiwang-si (KR); Jae Cheol Cho, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 238 days.

(21) Appl. No.: 14/893,921

(22) PCT Filed: May 9, 2014

(86) PCT No.: PCT/KR2014/004192
§ 371 (c)(1),
(2) Date: Nov. 24, 2015

(87) PCT Pub. No.: WO2015/012479
PCT Pub. Date: Jan. 29, 2015

(65) Prior Publication Data
US 2016/0114555 A1  Apr. 28, 2016

(30) Foreign Application Priority Data

Jul. 26, 2013 (KR) .................. 10-2013-0089175
Jul. 26, 2013 (KR) .................. 10-2013-0089178

(51) Int. Cl.
*B32B 5/02* (2006.01)
*B32B 3/26* (2006.01)
(Continued)

(52) U.S. Cl.
CPC ............... *B32B 5/02* (2013.01); *B32B 3/263* (2013.01); *B32B 27/12* (2013.01); *B32B 27/308* (2013.01);
(Continued)

(58) Field of Classification Search
CPC ........ B32B 2260/021; B32B 2260/046; B32B 2260/048; B32B 2262/101;
(Continued)

(56) References Cited

U.S. PATENT DOCUMENTS

2003/0175533 A1* 9/2003 McGarry ................. B32B 5/26
428/447
2008/0249244 A1* 10/2008 Meguriya ............... C08L 83/04
525/100

FOREIGN PATENT DOCUMENTS

KR  10-2006-0055100  5/2006
KR  10-2009-0039656  4/2009
(Continued)

OTHER PUBLICATIONS

International Search Report, corresponding to PCT/KR2014/004192, dated Aug. 27, 2014, 4 pages.

*Primary Examiner* — Michael B Nelson
(74) *Attorney, Agent, or Firm* — Lewis Roca Rothgerber Christie LLP

(57) ABSTRACT

Provided are: a composite sheet comprising a silicone matrix and a first sheet including a reinforcement material impregnated into the silicone matrix, wherein the first sheet has a compression elongation of about 30% or more; a method for manufacturing the same; and a display device including the same.

23 Claims, 2 Drawing Sheets

(51) Int. Cl.
  *B32B 27/12* (2006.01)
  *B32B 27/30* (2006.01)
  *B32B 37/12* (2006.01)
  *B32B 37/14* (2006.01)
  *D06M 15/693* (2006.01)
  *D06M 101/00* (2006.01)

(52) U.S. Cl.
  CPC .............. *B32B 37/12* (2013.01); *B32B 37/14* (2013.01); *D06M 15/693* (2013.01); *B32B 2260/021* (2013.01); *B32B 2260/046* (2013.01); *B32B 2260/048* (2013.01); *B32B 2262/101* (2013.01); *B32B 2307/306* (2013.01); *B32B 2307/414* (2013.01); *B32B 2307/418* (2013.01); *B32B 2307/54* (2013.01); *B32B 2307/546* (2013.01); *B32B 2383/00* (2013.01); *B32B 2457/20* (2013.01); *B32B 2457/202* (2013.01); *D06M 2101/00* (2013.01)

(58) Field of Classification Search
  CPC ........ B32B 2307/306; B32B 2307/414; B32B 2307/418; B32B 2307/54; B32B 2307/546; B32B 2383/00; B32B 2457/20; B32B 2457/202; B32B 27/12; B32B 27/308; B32B 37/12; B32B 37/14; B32B 3/263; B32B 5/02; D06M 15/693; D06M 2101/00
  See application file for complete search history.

(56) References Cited

FOREIGN PATENT DOCUMENTS

| KR | 10-2010-0083697 | 7/2010 |
|----|-----------------|--------|
| KR | 10-2013-0031703 | 3/2013 |
| KR | 10-2013-0077701 | 7/2013 |

* cited by examiner

[Fig. 1]
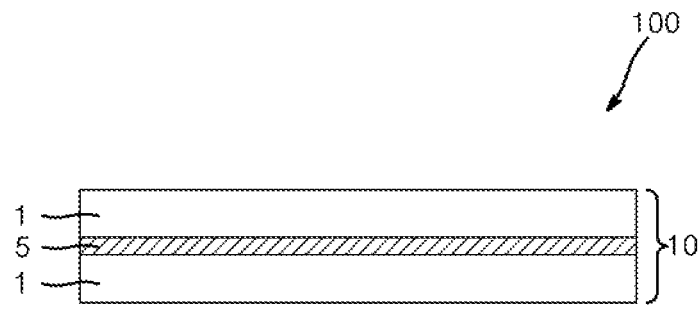
[Fig. 2]
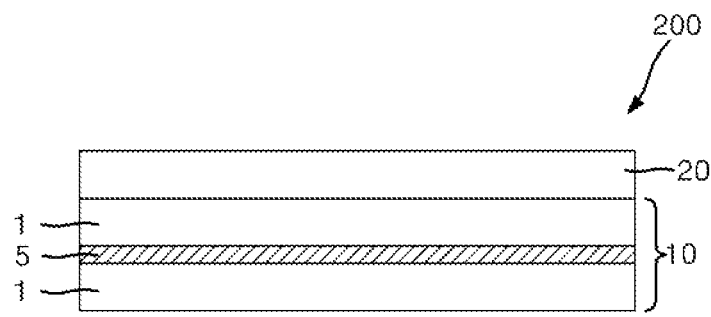
[Fig. 3]
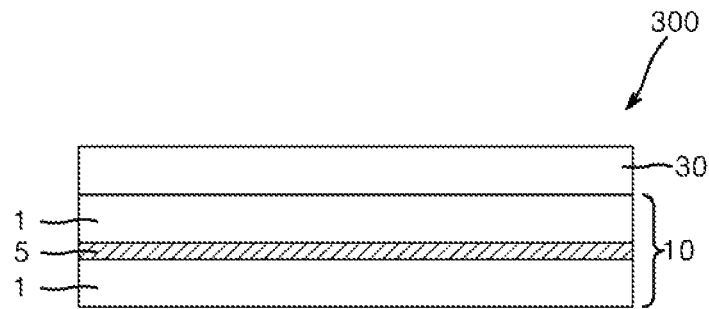

[Fig. 4]
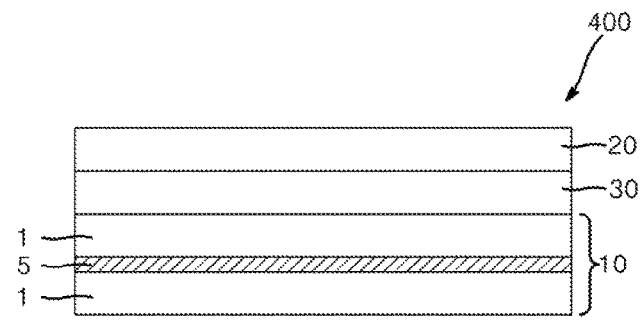
[Fig. 5]
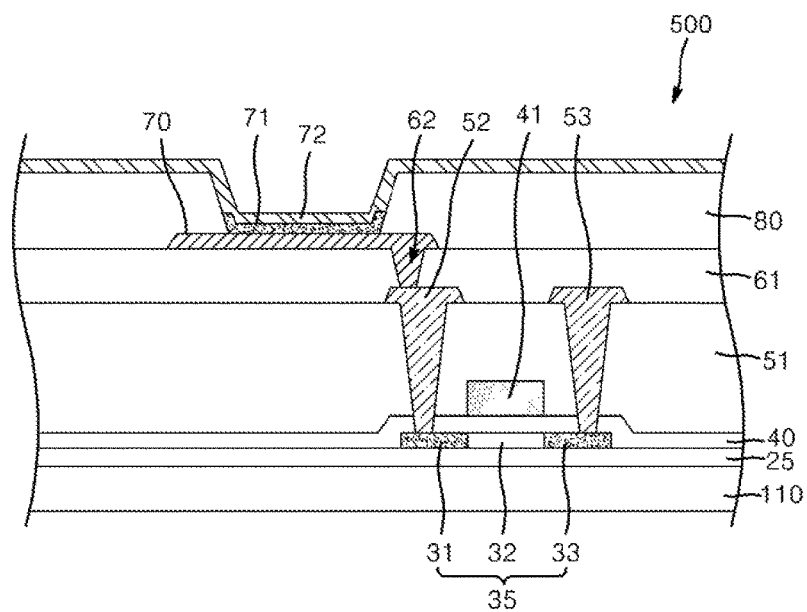

COMPOSITE SHEET, METHOD FOR MANUFACTURING SAME, AND DISPLAY DEVICE INCLUDING SAME

CROSS-REFERENCE TO RELATED APPLICATION(S)

This application is a National Phase Patent Application and claims priority to and the benefit of International Application Number PCT/KR2014/004192, filed on May 9, 2014, which claims priority to Korean Patent Application Number 10-2013-0089175, filed on Jul. 26, 2013, and Korean Patent Application Number 10-2013-0089178, filed on Jul. 26, 2013, the entire contents of all of which are incorporated herein by reference.

TECHNICAL FIELD

The present invention relates to a composite sheet, a preparation thereof and a display apparatus comprising the same.

BACKGROUND

Glass substrates have been replaced with substrates for flexible displays as materials of substrates for display apparatuses. The matrices with glass fibers or woven glass fibers impregnated may be used as substrates for flexible displays. Since the matrices of silicone materials have high thermal expansion coefficient over glass fibers, the substrates will be crack or break when treating flexible substrates at a high temperature. In addition, since there are problems of an occurrence of surface roughness and a difference of modulus of barrier layers and substrates when laminating barrier layers on substrates because the matrices comprise glass fibers, it is not possible to laminate barrier layers on substrates with high adhesion. Thus, researches on the technologies for forming buffer layers between barrier layers and substrates have been studied.

DISCLOSURE

Technical Problem

One aspect of the present invention is to provide a composite sheet without the occurrence of crack or the splitting of the interface between the matrix and the reinforcing material even though allowing it left at a high temperature of about 250° C. or more.

Another aspect of the present invention is to provide a composite sheet having high flexibility and heat resistance.

A further aspect of the present invention is to provide a composite sheet having high surface energy and modulus such that certain components or layers can be stably laminated on the composite sheet without peeling or breaking if the components or layers are laminated on the upper surface of the composite sheet.

Yet another aspect of the present invention is to provide a composite sheet having improved surface roughness and high adhesion to the barrier layer.

Yet another aspect of the present invention is to provide a composite sheet having high stability and bonding strength between the matrix and the buffer layer.

Yet another aspect of the present invention is to provide a composite sheet having high stability without the occurrence of crack.

Technical Solution

A composite sheet of the present invention may comprise a first sheet comprising a silicone matrix, and a reinforcing material impregnated in the silicone matrix, wherein the first sheet may have a compressive elongation of about 30% or more.

A composite sheet of the present invention may comprise a first sheet comprising a silicone matrix, and a reinforcing material impregnated in the silicone matrix, wherein the first sheet may have a transmittance of about 80% or more on a thickness of 100 μm at 25° C. and at a wavelength of 550 nm after allowing it left at 250° C. for 1 hour.

A process of preparing a composite sheet of the present invention may comprise forming a laminate in which a second sheet composition and a base film are formed on a matrix composition in which a reinforcing material is impregnated, and curing the second sheet composition and the matrix composition, wherein, before the second sheet composition and the matrix composition are cured, the matrix composition and the second sheet composition are in the state not fully cured.

A display apparatus of the present invention may comprise a substrate, and an element for apparatuses formed on the substrate, wherein the substrate may comprise the composite sheet described above.

Advantageous Effects

The present invention provides a composite sheet without the occurrence of crack or the splitting of the interface between the matrix and the reinforcing material even though allowing it left at a high temperature of about 250° C. or more.

The present invention provides a composite sheet having high flexibility and heat resistance.

The present invention provides a composite sheet having high surface energy and modulus such that certain components or layers can be stably laminated on the composite sheet without peeling or breaking if the components or layers are laminated on the upper surface of the composite sheet.

The present invention provides a composite sheet having improved surface roughness and high adhesion to the barrier layer.

The present invention provides a composite sheet having high stability and bonding strength between the matrix and the buffer layer.

The present invention provides a composite sheet having high stability without the occurrence of crack.

DESCRIPTION OF DRAWINGS

FIG. 1 is a schematic cross-sectional view of a composite sheet according to one aspect of the present invention.

FIG. 2 is a schematic cross-sectional view of a composite sheet according to another aspect of the present invention.

FIG. 3 is a schematic cross-sectional view of a composite sheet according to still another aspect of the present invention.

FIG. 4 is a schematic cross-sectional view of a composite sheet according to still another aspect of the present invention.

FIG. 5 is a schematic cross-sectional view of a display apparatus according to one aspect of the present invention.

BEST MODE

Hereinafter, embodiments of the present invention will be described in detail with reference to the accompanying drawings. It should be understood that the present invention may be embodied in different ways and is not limited to the following embodiments. In the drawings, elements irrelevant to the description will be omitted for clarity. Like components will be denoted by like reference numerals throughout the specification.

As used herein, the term "compressive elongation" means an elongation measured after compression strain of the first sheet. The compressive elongation may be determined by measuring the length (s, unit: μm) in which a micro indenter is indented into the point at which the portion consisted of the matrix in the first sheet (for example, the window portion in the composite sheet (a portion consisted of the resin, in which wefts and warps of glass fibers are not cross if the glass cloth is used as the reinforcing material)) wherein a force of 1000 mN per unit area (1 mm$^2$) is applied to the portion consisted of the matrix with the micro indenter at 0.01 mm/sec, to break the matrix, and by obtaining a percentage value (s/t×100) of the measured length (s) to the total thickness (t, unit: μm) of the first sheet.

As used herein, the term "modulus", referring to the first sheet and the second sheet, means a value calculated by applying a force of 10 mN per unit area (1 mm$^2$) with a micro indenter (Vicker indenter) to the portion consisted of the matrix in the first sheet (for example, the window portion in the composite sheet (a portion consisted of the resin, in which wefts and warps of glass fibers are not cross if the glass cloth is used as the reinforcing material)) or second sheet, respectively, for 10 seconds, and creeping for 3 seconds and relaxing for 10 seconds.

As used herein, the term "cross cut" means a value calculated as a percentage of a ratio (n/N) of the sample number N remaining in the composite sheet after delaminating to the sample number n of the second sheet before delaminating, when the second sheet in the composite sheet is cut into the certain sample number N having the same size of 1 mm×1 mm (width×length) and the second sheet is delaminated from the composite sheet with 3M (810, 18 mm) tape at 180° (ASTM D-3359).

As used herein, the term "curing rate" may be |1−(B/A)|×100 if an intensity of the absorption peak at peak of about 1410 cm$^{-1}$ before curing the composition is designated as A, and an intensity of the absorption peak at peak of about 1410 cm$^{-1}$ after curing is designated as B, with the reference of 1725 cm$^{-1}$.

Hereinafter, referring to FIG. 1, a composite sheet according to one aspect of the present invention will be described. FIG. 1 is a schematic cross-sectional view of a composite sheet according to one aspect of the present invention.

Referring to FIG. 1, a composite sheet 100 according to one aspect of the present invention may comprise a first sheet 10 comprising a matrix 1, and a reinforcing material 5 impregnated in the matrix 1.

The first sheet 10 may have a compressive elongation of about 30% or more, for example, about 30 to 60%. If the compressive elongation is less than about 30%, then the composite sheet will crack and split in the interface of the matrix and the reinforcing material since it is not possible to compensate the difference of thermal expansion coefficient between the matrix and the reinforcing material in a thin film transistor (TFT) process comprising treating the composite sheet repeatedly at a high temperature of about 250° C. or more.

Therefore, the first sheet 10 may have a transmittance of about 80% or more, for example, about 80 to 99% at 25° C. and at a wavelength of 550 nm after allowing it left at 250° C. for 1 hour on a thickness of 100 μm. If the composite sheet is used in the TFT process comprising treating the composite sheet repeatedly at a high temperature of about 250° C. or more, the composite sheet can not be used as the substrates when it cracks and the transmittance is less than 80%.

Furthermore, the first sheet 10 may have a modulus of about 5 to 20 MPa, for example, about 5 to 15 MPa. Within this range, certain components or layers will not be delaminated even though the components or layers are laminated on the upper surface of the composite sheet. Generally, although the higher modulus of the composite sheet has, the lower compressive elongation of the composite sheet has, but the composite sheet of some embodiments of the present invention may secure high compressive elongation and certain range of modulus, and thus secure the effect due to the thermal stability and modulus of the composite sheet.

The composite sheet may have a surface roughness (Ra) of about 100 nm or less, particularly about 50 nm or less, and more particularly about 5 nm to 50 nm, and the composite sheet may have a thermal expansion coefficient of about 0 ppm/° C. to 400 ppm/° C., particularly about 0 ppm/° C. to 10 ppm/° C., and more particularly about 3 ppm/° C. to 7 ppm/° C. Within this range, the thermal strain will be suppressed when the composite sheet is prepared as the flexible substrate. The thermal expansion coefficient may be determined according to ASTM E 831 method by measuring the dimensional change over the temperature using a Thermo-mechanical analyser (expansion mode, force 0.05 N) from the curve of the change in length of the specimen verse the temperature (30 to 250° C.).

The composite sheet may have a thickness of about 15 μm to 200 μm. Within this range, the composite sheet may be used as the flexible substrate. The composite sheet may be transparent in the region of visible light.

The matrix 1 may have a tensile elongation of about 15% or more, for example, about 15 to 40%. Within this range, the composite sheet may have excellent thermal stability, heat resistance and flexibility, and will not crack under the treatment at a high temperature and will not split in the interface of the matrix and the reinforcing material. Moreover, the composite sheet will not be delaminated even though certain components or layers are laminated on the upper surface of the composite sheet. The "tensile elongation" means a value measured on the matrix specimen (width 5 mm, length 20 mm) using a TA.XT.plus (TA instrument) at a rate of 50 mm/min.

In addition, the matrix 1 may comprise, as the silicone matrix, specifically a cured product of the linear silicone rubber. It is possible to alleviate the difference between the thermal expansion of the matrix and the thermal expansion of the reinforcing material, and achieve flexibility as the substrates even though treating the composite sheet at a high temperature because the linear silicone rubber has a structure in which the siloxane units are linked to certain length and increases the tensile elongation of the matrix.

Hereinafter, the details of one embodiment of the matrix will be described.

In one aspect, the matrix may comprise a cured product of the matrix composition comprising a linear silicone rubber and a cross-linker.

Specifically, the linear silicone rubber may be a siloxane oligomer or polymer having a curable functional group, for example, a copolymer comprising a first repeat unit having a curable functional group and at least one second repeat unit not having a curable functional group. The siloxane having the curable functional group may be formed via the polymerization of the first monomer having the curable functional group and at least one second monomer not having the curable functional group, and the first monomer having the curable functional group may be present in an amount of about 1.0 wt % or less, for example, about 0.01 to 1.0 wt % in the total monomer. Within this range, it is possible to decrease the occurrence of crack and increase the tensile elongation of the matrix to increase the thermal stability of the composite by adding the curable functional group as a crosslinking site at certain extent. The "curable functional group" is a functional group which allows the matrix composition to be cured, and is capable of crosslinking a cross-linker and/or a non-rubber silicone compound, and may be an unsaturated $C_2$-$C_{12}$ hydrocarbon group having an unsaturated bond at the terminal, for example, a vinyl group or an allyl group.

For example, the linear silicone rubber may be a polydimethylsiloxane (PDMS) containing a vinyl group. In one embodiment, the polydimethylsiloxane containing a vinyl group may be prepared from a composition for preparing silicone rubbers comprising phenylmethyldimethoxysilane (PMDMS), dimethyldimethoxysilane (DMDMS) and vinylmethyldimethoxysilane (VMDMS), particularly by hydrolysis, polymerization and end capping reaction of PMDMS, DMDMS and VMDMS. VMDMS may be present in an amount of about 1.0 wt % or less, for example, about 0.01 to 1.0 wt % based on the total amount of PMDMS, DMDMS and VMDMS. Within this range, it is possible to maximize the tensile elongation of the matrix, increase the compressive elongation of the composite sheet, decrease the occurrence of crack of the composite sheet at a high temperature, and increase the stability of the composite sheet by adding the curable functional group as a crosslinking site at certain extent. PMDMS may be present in an amount of about 10 to 80 wt %, and DMDMS may be present in an amount of about 10 to 90 wt %, and particularly about 19 to 85 wt % according to the desired refractive index based on the total amount of PMDMS, DMDMS and VMDMS. Within this range, the desired refractive index of the composite sheet will be achieved.

In one embodiment, the linear silicone rubber may be a linear siloxane oligomer or polymer having a curable functional group, and an aliphatic hydrocarbon group, and/or an aromatic hydrocarbon group, and the like. The aliphatic hydrocarbon group, aromatic hydrocarbon group, and the like serve to support the matrix and build up the bonding between the matrix and the reinforcing material, and particularly the aromatic hydrocarbon group serves to increase the transmittance of the composite sheet by matching the refractive index of the reinforcing material and the matrix. Specifically, the linear silicone rubber may comprise repeat units of Formulae 1, 2, and 3:

<Formula 1>

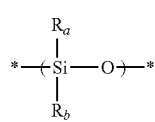

<Formula 2>

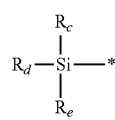

<Formula 3>

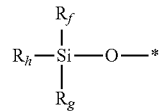

(wherein Formula 1 to Formula 3, * is a linking site of an element, $R_a$, $R_b$, $R_c$, $R_d$, $R_e$, $R_f$, $R_g$, and $R_h$ are each independently hydrogen, a $C_1$-$C_{10}$ alkyl group, a $C_6$-$C_{20}$ aryl group, a $C_7$-$C_{20}$ arylalkyl group, or an unsaturated $C_2$-$C_{12}$ hydrocarbon group having a double bond at the terminal, and at least one of $R_a$, $R_b$, $R_c$, $R_d$, $R_e$, $R_f$, $R_g$, and $R_h$ are an unsaturated $C_2$-$C_{12}$ hydrocarbon group having a double bond at the terminal). More specifically, the linear silicone rubber may comprise a repeat unit of Formula 1 and repeat units of Formulae 2 and 3 at the terminal.

Specifically, the linear silicone rubber may comprise a repeat unit of Formula 4:

<Formula 4>

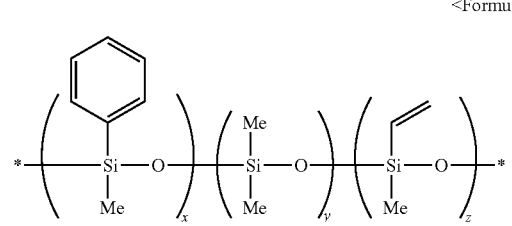

(wherein Formula 4, * is a linking site of an element, 0<x<1, 0<y<1, 0≤z≤1, and Me is a methyl group).

For example, the linear silicone rubber may be represented by Formulae 5 or 6:

<Formula 5>

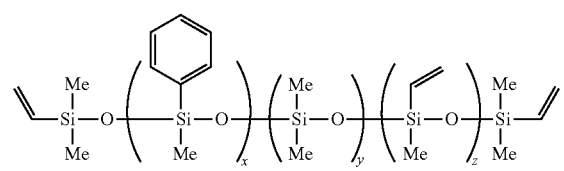

(wherein Formula 5, 10≤x≤400, 10≤y≤700, 0≤z≤700 (integer), and Me is a methyl group)

<Formula 6>

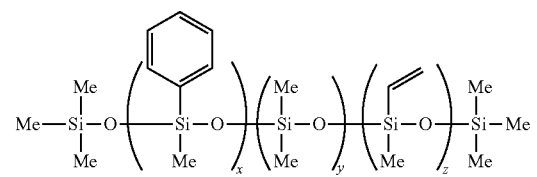

(wherein Formula 6, 10≤x≤400, 10≤y≤700, 0≤z≤700 (integer), and Me is a methyl group).

The linear silicone rubber may have a number average molecular weight (Mn) of about 2,000 to 50,000 g/mol. Within this range, it is possible to support the matrix, and increase the compressive elongation of the composite sheet.

The matrix may be formed by curing a matrix composition comprising the linear silicone rubber and the cross-linker. The cross-linker may be a single molecule having two or more of —Si—H groups or oligomer thereof, capable of hydrosilylating with the curable functional group of the linear silicone rubber by activated by heat or UV. Furthermore, the cross-linker may achieve excellent miscibility with resins such as the linear silicone rubber, and the like, and high heat resistance because of the siloxane units.

The linear silicone rubber may be present in an amount of about 80 to 99 wt %, and the cross-linker may be present in an amount of about 1 to 20 wt %, on the solid contents in the matrix composition. Within this range, it is possible to secure the compressive elongation of the composite sheet to increase the thermal stability of the composite sheet, and decrease the occurrence of crack to increase the stability of the composite sheet.

For example, the cross-linker may comprise compounds represented by Formulae 7, 8, and 9:

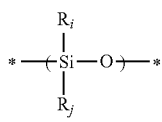

<Formula 7>

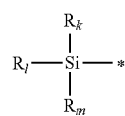

<Formula 8>

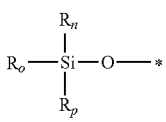

<Formula 9>

(wherein Formula 7 to Formula 9, * is a linking site of an element, $R_i$, $R_j$, $R_k$, $R_l$, $R_m$, $R_n$, $R_o$, and $R_p$ are each independently hydrogen, a $C_1$-$C_{10}$ alkyl group, a $C_6$-$C_{20}$ aryl group, or a silyloxy group, and two or more of $R_i$, $R_j$, $R_k$, $R_l$, $R_m$, $R_n$, $R_o$, and $R_p$ are hydrogen). The "silyloxy group" means a —Si—O— group having a $C_1$-$C_{10}$ alkyl group or hydrogen. In other words, while the cross-linker may comprise the repeat unit of Formula 7, the terminal may comprise compounds of Formulae 8 and 9.

Specifically, the cross-linker may be a compound selected from the group consisting of compounds represented by any one of Formulae 10 to 14, and oligomers of Formula 15, or mixtures thereof:

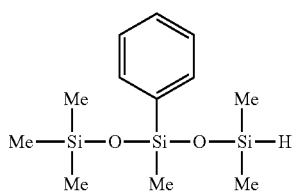

<Formula 10>

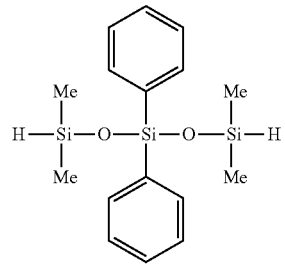

<Formula 11>

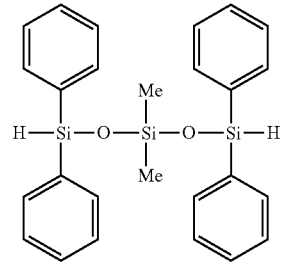

<Formula 12>

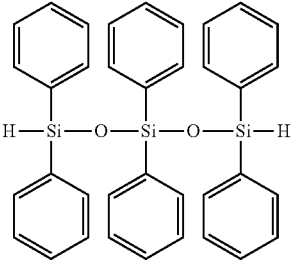

<Formula 13>

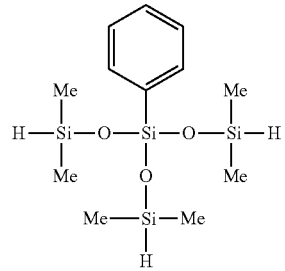

<Formula 14>

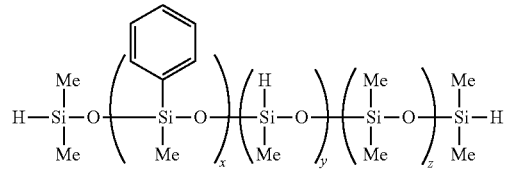

<Formula 15>

(wherein Formula 15, $0 \leq x \leq 30$, $0 \leq y \leq 40$, $0 \leq z \leq 40$ (integer), and Me is a methyl group). The cross-linker of Formula 15 may have a number average molecular weight (Mn) of about 200 to 3,000 g/mol. Within this range, it is possible to secure excellent miscibility with resins such as the linear silicone rubber, and the like, and high curing efficiency.

If a ratio of mole number of silicone-curable functional group (for example, Si-vinyl group) in the linear silicone rubber to the weight average molecular weight of the linear silicone rubber is referred to A, and a ratio of mole number of silicone-H (Si—H) in the cross-linker to the (weight) average molecular weight of the cross-linker is referred to B, A:B may be about 1:1 to 1:3, for example, about 1:1 to 1:2.

Within this range, it is possible to secure the compressive elongation of the composite sheet and increase thermal stability of the composite sheet.

The matrix composition may further comprise at least one of a catalyst and an inhibitor.

The catalyst may serve to increase the rate of the cross-linking reaction, and may be any catalyst typically used in the preparation of the composite sheet for flexible substrates. For example, the catalyst may be, as the platinum or rhodium catalyst, a complex of platinum and organic compounds, a complex of platinum and vinylated organosiloxanes, a complex of rhodium and olefins, cyclopentadienyl-platinum complex, and the like. Specifically, the catalyst may be vinylalkyl silane platinum complex comprising a Karstedt's catalyst, platinum black, chloroplatinic acid, chloroplatinic acid-olefin complex, chloroplatinic acid-alcohol complex, trimethyl(methylcyclopentadienyl)platinum (IV) or mixtures thereof. The catalyst may be present in an amount of about 2 ppm to 2,000 ppm, for example, about 5 ppm to 500 ppm based on the weight of metals in the linear silicone rubber. Within this range, it is possible to increase sufficiently the rate of the crosslinking reaction, and eliminate the use of the unnecessary catalyst.

The inhibitor may suppress the action of the catalyst at an ambient temperature and not suppress the action of the catalyst at a high temperature in order to cure the matrix composition at a high temperature, and may be any inhibitor typically used in the preparation of the composite sheet for flexible substrates. For example, the inhibitor may be selected from the group consisting of acetylenic alcohol such as 3,5-dimethyl-1-hexyn-3-ol, etc., pyridine, phosphine, organic phosphite, unsaturated amide, dialkyl carboxylate, dialkyl acetylene dicarboxylate, alkylated maleate, diallyl maleate, or mixtures thereof. The inhibitor may be present in an amount of about 100 ppm to 2,500 ppm in the linear silicone rubber. Within this range, it is possible to suppress the catalyst over the temperature, and control curing at a high temperature.

Hereinafter, the details of another embodiment of the matrix will be described.

In another embodiment, the matrix may comprise a cured product of the matrix composition comprising the linear silicone rubber, the cross-linker, and a non-rubber silicone compound. Since the composition further comprises the non-rubber silicone compound, it is possible to control easily the modulus of the composite sheet by controlling a ratio of the mole number of the linear silicone rubber and the non-rubber silicone compound. The matrix according to another embodiment is the same as the matrix according to one embodiment except that the composition further comprises the non-rubber silicone compound.

The non-rubber silicone compound may be, for example, a cyclic siloxane compound. The cyclic siloxane compound may have a structure in which the siloxane units are linked in a ring form and increase the modulus of the composite sheet. The cyclic siloxane compound may comprise a curable functional group, and an aliphatic hydrocarbon group and/or an aromatic hydrocarbon group, and the curable functional group may be an unsaturated $C_2$-$C_{12}$ hydrocarbon group having a double bond at the terminal, for example, a vinyl group, or an allyl group.

In one embodiment, the cyclic siloxane compound may be a cyclic siloxane compound in which 3 to 10 of same or different siloxane units are linked, for example, compounds in which the curable functional group, and the like is linked to at least one silicone selected cyclotrisiloxane, cyclotetrasiloxane, cyclopentasiloxane, cyclohexasiloxane, cycloheptasiloxane, or cyclooctasiloxane. For example, the cyclic siloxane compound may comprise tetravinyltetramethyl cyclotetrasiloxane, a derivative of tetravinyltetramethyl cyclotetrasiloxane, a derivative of tetrazmethyl cyclotetrasiloxane, and the like.

In one embodiment, the cyclic siloxane compound may be represented by Formula 16:

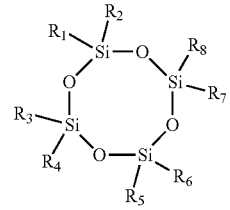

<Formula 16>

(wherein Formula 16, $R_1$, $R_2$, $R_3$, $R_4$, $R_5$, $R_6$, $R_7$, and $R_8$ are each independently a $C_1$-$C_{10}$ alkyl group, a $C_6$-$C_{20}$ aryl group, a vinyl group, an allyl group, an allyloxy group, a vinyloxy group, or Formula 17,

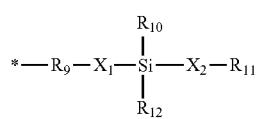

<Formula 17>

(wherein Formula 17, * is a linking site of Si in Formula 16, $R_9$ is a $C_1$-$C_{10}$ alkylene group, or a $C_6$-$C_{20}$ arylene group, $R_{10}$, $R_{11}$, and $R_{12}$ are each independently a $C_1$-$C_{10}$ alkyl group, a $C_6$-$C_{20}$ aryl group, a vinyl group, an allyl group, an allyloxy group, or a vinyloxy group, and $X_1$ and $X_2$ are each independently a single bond, O, S, or NR, wherein R is hydrogen or a $C_1$-$C_{10}$ alkyl group), at least one of $R_1$, $R_2$, $R_3$, $R_4$, $R_5$, $R_6$, $R_7$, and $R_8$ are a vinyl group, an allyl group, an allyloxy group, a vinyloxy group, Formula 17 in which at least one of $R_{10}$, $R_{11}$, and $R_{12}$ are a vinyl group, Formula 17 in which at least one of $R_{10}$, $R_{11}$, and $R_{12}$ are an allyl group, Formula 17 in which at least one of $R_{10}$, $R_{11}$, and $R_{12}$ are an allyloxy group, or Formula 17 in which at least one of $R_{10}$, $R_{11}$, and $R_{12}$ are a vinyloxy group).

The derivative may be prepared by any typical method. For example, the derivative may be prepared by substituting alkyl group with halogenated alkyl group in tetravinyl tetraalkyl cyclotetrasiloxane, and then reacting the substituted product with the curable functional group containing compound, for example, allyl alcohol, vinyl alcohol, and the like under the Karstedt's platinum catalyst.

Specifically, the cyclic siloxane compound may be represented by Formulae 18 to 43, but not limited thereto:

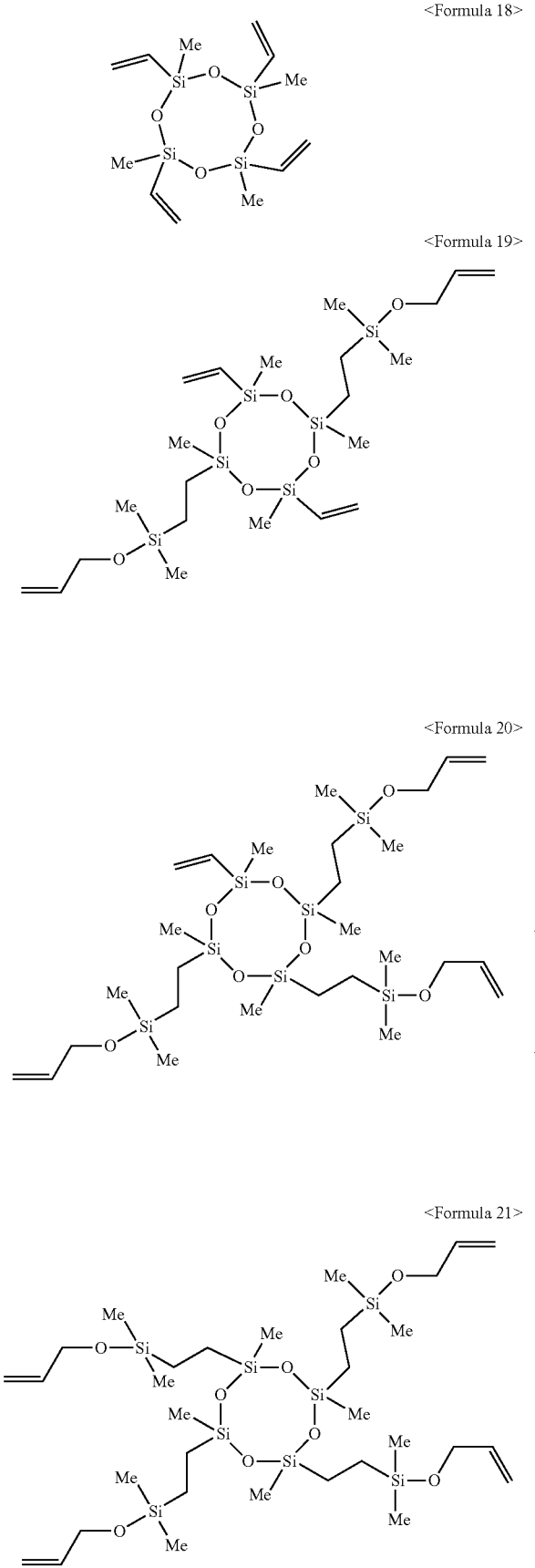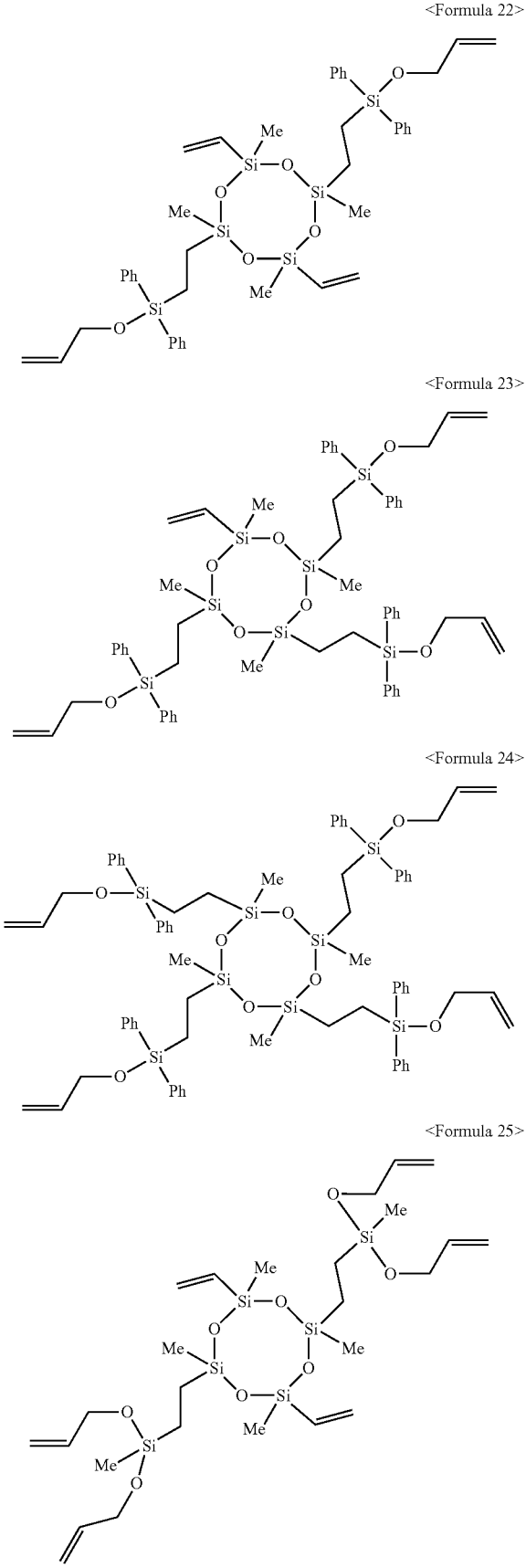

-continued
<Formula 26>
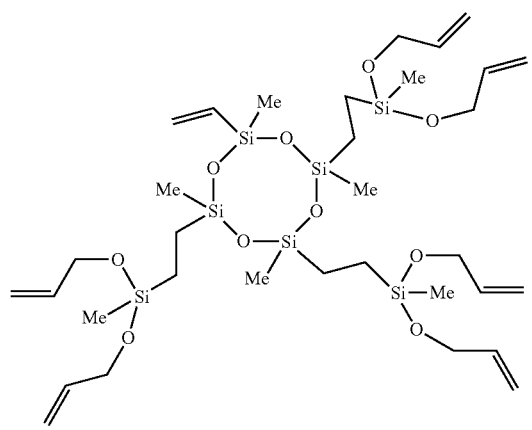
<Formula 29>
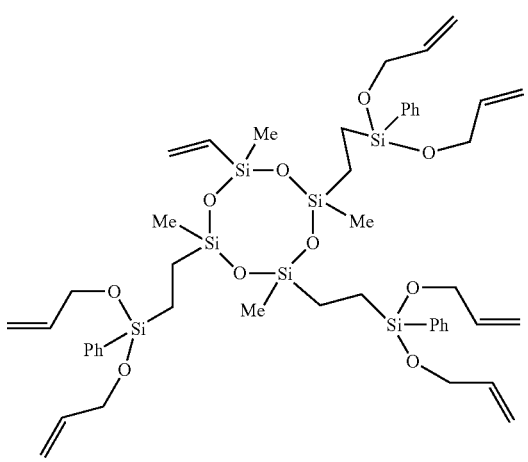
<Formula 27>
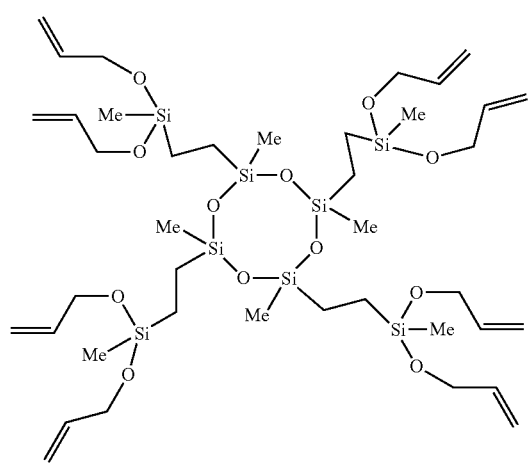
<Formula 30>
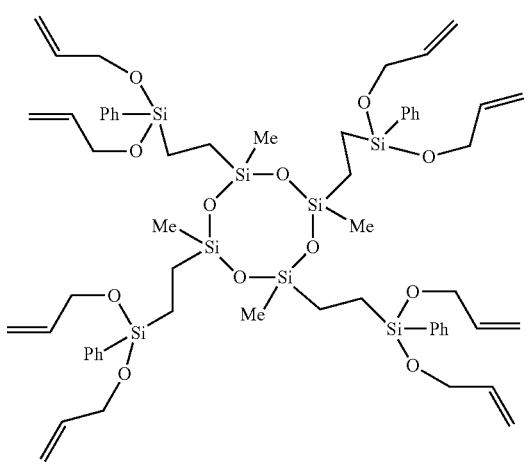
<Formula 28>
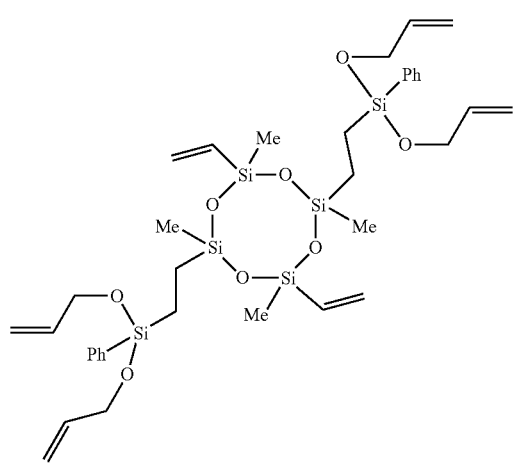
<Formula 31>
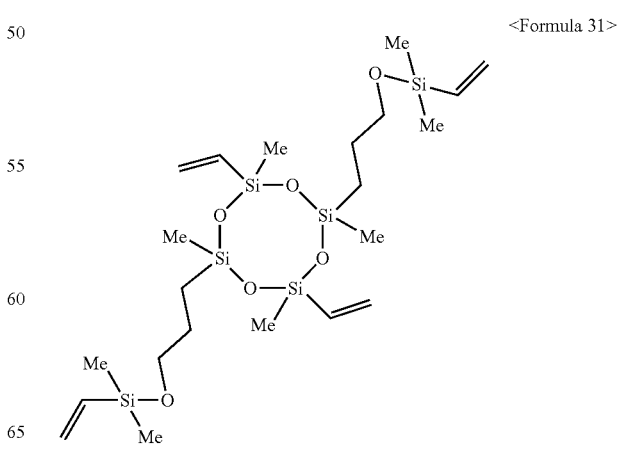

<Formula 32>
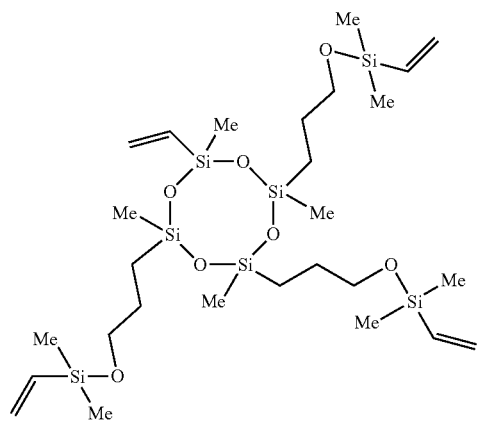
<Formula 33>
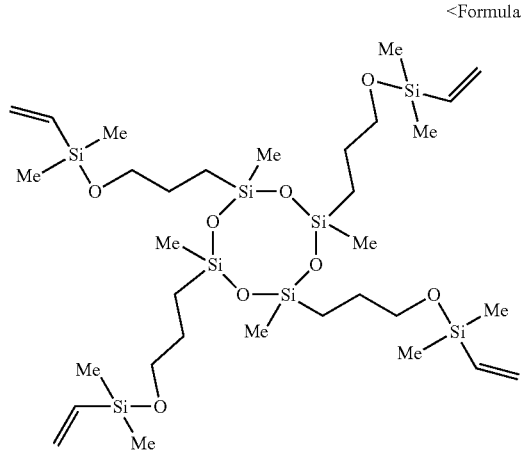
<Formula 34>
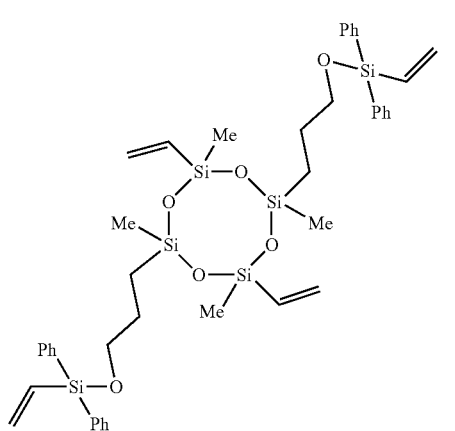
<Formula 35>
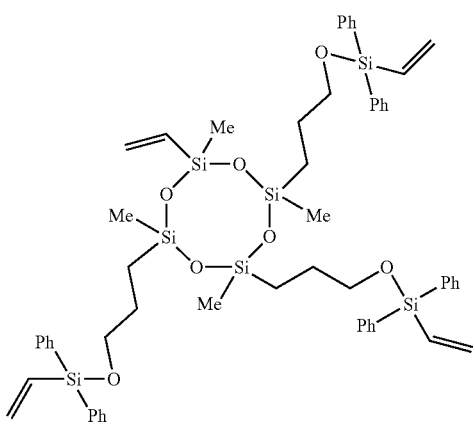
<Formula 36>
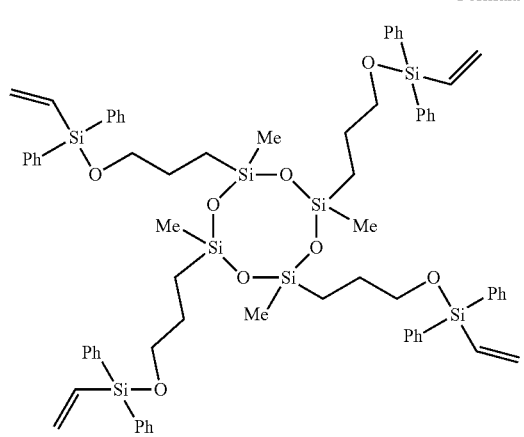
<Formula 37>
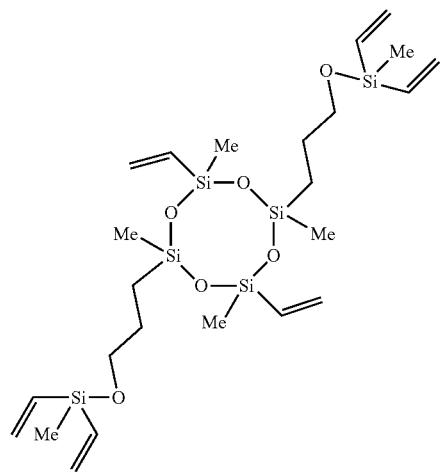

<Formula 38>

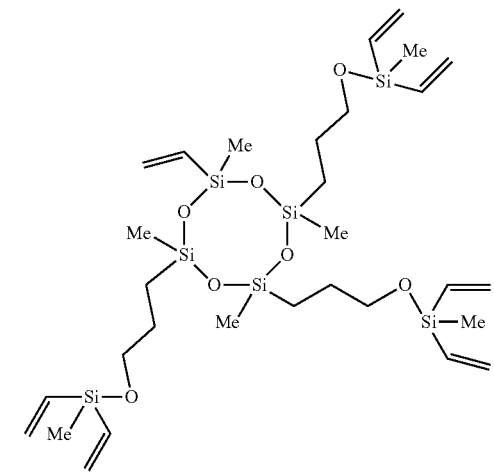

<Formula 39>

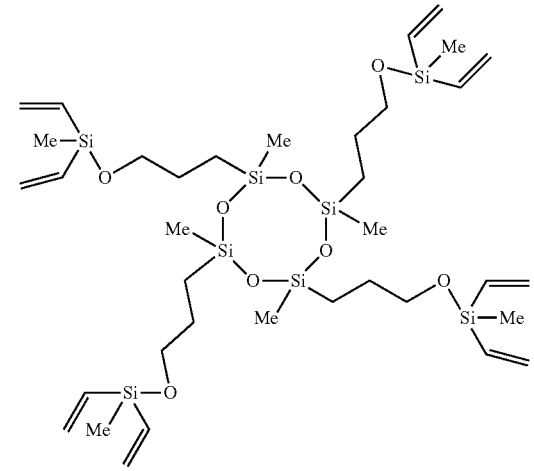

<Formula 40>

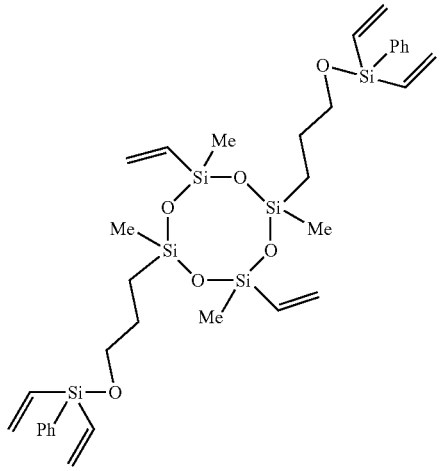

<Formula 41>

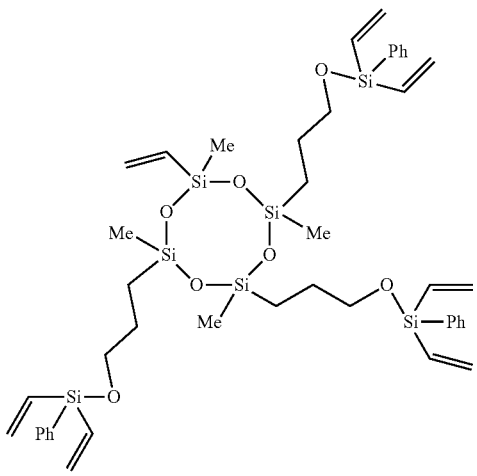

<Formula 42>

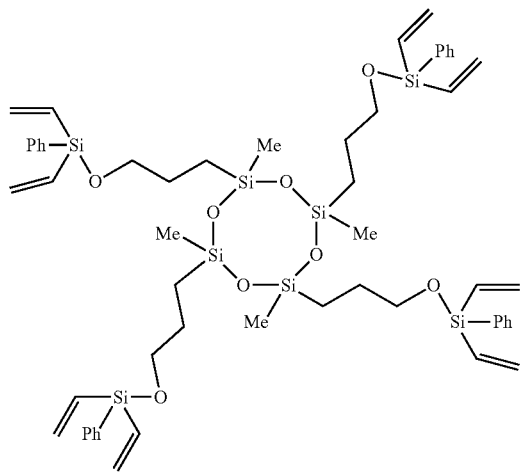

<Formula 43>

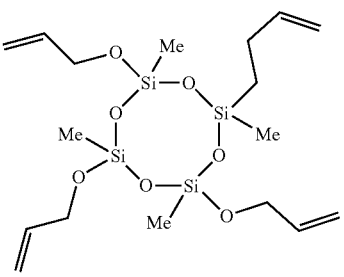

(wherein Formula 18 to Formula 43, Me is a methyl group, and Ph is a phenyl group).

If a ratio of mole number of silicone-curable functional group (for example, Si-vinyl group) in the non-rubber silicone compound to the molecular weight of the non-rubber silicone compound is referred to C, and a ratio of mole number of silicone-curable functional group (for example, Si-vinyl group) in the linear silicone rubber to the weight average molecular weight of the linear silicone rubber is referred to A, C:A may be about 1:1 to 6:1, for example, about 3:1 to 6:1. Within this range, it is possible to secure the compressive elongation of the composite sheet and increase thermal stability of the composite sheet while retaining certain modulus. In addition, if a ratio of mole number of silicone-H (Si—H) in the cross-linker to the (weight) average molecular weight of the cross-linker is referred to B, (A+C):B may be about 1:1 to 1:3, for example about 1:1 to 1:2. Within this range, it is possible to secure the compressive elongation of the composite sheet and increase thermal stability of the composite sheet while retaining certain modulus, and increase stability of the composite sheet due to the decrease in the occurrence of crack.

The linear silicone rubber may be present in an amount of about 60 to 80 wt %, and the non-rubber silicone compound may be present in an amount of about 1 to 30 wt %, and the cross-linker may be present in an amount of about 1 to 20 wt %, on the solid contents in the matrix composition. Within this range, it is possible to increase the compressive elongation of the composite sheet, and prevent the decrease in the transmittance of the composite sheet due to the unreacted materials.

The matrix may be present in an amount of about 30 to 70 wt %, for example, about 40 to 60 wt % in the composite sheet. Within this range, it is possible to secure high heat resistance and mechanical properties of the flexible substrate, and increase transparency, flexibility, and lightness as well as provide flexibility with the composite sheet.

The reinforcing material 5 may be embedded in the matrix 1, and particularly may be embedded in the matrix via the dispersion into a mono-layer or a multi-layer structure. Although FIG. 1 shows a structure in which the reinforcing material 5 is impregnated in the matrix 1 in a lamellar form, the reinforcing material may be dispersed in the matrix, or impregnated in the woven form, or impregnated uni-directionally. Furthermore, the reinforcing material may be embedded into a mono-layer or a multi-layer.

The reinforcing material may be present in an amount of about 40 to 70 wt %, for example, about 45 to 65 wt % in the composite sheet. Within this range, it is possible to secure high heat resistance and mechanical properties of the flexible substrate, and increase transparency, flexibility, and lightness as well as provide flexibility with the composite sheet.

The reinforcing material 5 may have a refractive index difference (an absolute value of the refractive index of the reinforcing material—the refractive index of the matrix) with the matrix 1 of about 0.01 or less. Within this range, it is possible to achieve excellent transparent and translucency. For example, the refractive index difference may be about 0 to 0.005, for example, about 0.0001 to 0.005. Specifically, it is possible to use the reinforcing material having a refractive index of about 1.5 or less, and particularly about 1.45 to 1.49. The reinforcing material having a refractive index of about 1.5 or less may have low refractive index difference with the silicone matrix, and thus secure transparency of the composite sheet. Further, it is possible to use the reinforcing material having a thermal expansion coefficient of about 10 ppm/° C. or less, and particularly about 3 to 5 ppm/° C. If such reinforcing material may be used, the composite sheet may have low thermal expansion coefficient, and thus improvement in heat resistance. The thermal expansion coefficient may be determined from the curve of length change of the specimen over the temperature (30 to 250° C.) by measuring the dimensional change over the temperature using a Thermo-mechanical analyser (expansion mode, force 0.05 N) according to ASTM E 831 method. Specifically, at least one selected from the group consisting of glass fibers, glass fiber clothes, glass fabrics, glass non-woven clothes and glass meshes may be used as the reinforcing material.

Hereinafter, referring to FIG. 2, a composite sheet according to another aspect of the present invention will be described. FIG. 2 is a schematic cross-sectional view of a composite sheet according to another aspect of the present invention.

Referring to FIG. 2, a composite sheet 200 according to another aspect of the present invention may comprise a first sheet 10 comprising a matrix 1 and a reinforcing material 5 impregnated in the matrix 1, and a barrier layer 20 formed on the upper surface of the first sheet 10. A composite sheet according to another aspect of the invention is the same as the composite sheet according to one aspect of the invention except that the composite sheet further comprises the barrier layer 20. Furthermore, although it is shown in FIG. 2 that one barrier layer is formed on the upper surface of the matrix, two or more barrier layers may be formed, and may be formed on the lower surface as well as the upper surface of the matrix.

The barrier layer 20 may be formed on one side of the matrix 1, and achieve the effect of maximizing gas barrier property, moisture vapor permeability, mechanical properties, or smoothness of the composite sheet 200. In one embodiment, the barrier layer 20 may comprise at least one of silicon nitride, silicon oxide, silicon carbide, aluminum nitride, indium tin oxide (ITO), or indium zinc oxide (IZO). The barrier layer 20 may have a modulus of about 5 to 20 GPa, and particularly about 10 to 20 GPa, and a thickness of about 5 to 300 nm. Within this range, it is possible to control excellent surface flatness and efficient moisture vapor permeability without influencing transmittance of the matrix with the reinforcing material impregnated.

The barrier layer 20 may be formed on the surface of the matrix 1 by physical deposition, chemical deposition, coating, sputtering, evaporation, ion plating, wet coating, or organic inorganic multi-layer coating.

Hereinafter, referring to FIG. 3, a composite sheet according to still another aspect of the present invention will be described. FIG. 3 is a schematic cross-sectional view of a composite sheet according to still another aspect of the present invention.

Referring to FIG. 3, a composite sheet 300 according to still another aspect of the present invention may comprise a first sheet 10 comprising a matrix 1 and a reinforcing material 5 impregnated in the matrix 1, and a second sheet 30 formed on the upper surface of the first sheet 10. When the composite sheet further comprises the second sheet 30, although certain components or layers are laminated on the upper surface of the composite sheet, they are not easily delaminated from the composite sheet, the composite sheet does not break, and the barrier layer may be stably laminated. A composite sheet according to still another aspect of the invention is the same as the composite sheet according to one aspect of the invention except that the second sheet 30 is further formed on the upper surface of the first sheet 10. Therefore, the second sheet 30 only will be described.

The second sheet 30 may have a surface energy (for example, at 25° C.) of about 55 dyne/cm or more, and a modulus of about 20 MPa or more. If the surface energy and modulus of the second sheet are within this range, although certain components or layers are laminated on the upper surface of the composite sheet, they are not easily delaminated from the composite sheet and the composite sheet does not break. For example, the second sheet 30 may have a surface energy of about 55 to 70 dyne/cm, and a modulus of about 20 MPa to 5 GPa.

Moreover, when the second sheet 30 having higher surface energy than the first sheet 10 and modulus equal or higher than the first sheet 10 is formed on the upper surface of the first sheet 10, it is possible to laminate stably the barrier layer on the composite sheet due to the increase in surface energy and modulus of the composite sheet, and decrease surface roughness (Ra) of the composite sheet by modifying the surface of the first sheet 10 with the second sheet 30. In other words, in still another embodiment of the present invention, if a modulus of the first sheet 10 is designated as M1, a modulus of the second sheet 30 is designated as M2, a surface energy of the first sheet 10 is designated as S1, and a surface energy of the second sheet 30 is designated as S2, then M1≤M2 and S1<S2. In this way, the second sheet may improve the surface roughness of the composite sheet as the buffer layer and increase adhesion of the barrier layer.

The thickness of the first sheet 10 and the second sheet 30 is not particularly limited. If the thickness of the first sheet 10 is designated as T1 and the thickness of the second sheet 30 is designated as T2, and then T1>T2. Within this range, the composite sheet may be used as the flexible substrate. Specifically, T1 may be about 15 to 200 μm, and T2 may be about 1 to 15 μm.

Although the first sheet 10 and the second sheet 30 may be prepared separately and then laminated with an adhesive layer, and the like, the first sheet 10 and the second sheet 30 may be prepared integrately to decrease overall thickness of the composite sheet, improve modulus, and increase bonding strength and stability between the first sheet and the second sheet. The "integrately" means a state in which the first sheet and the second sheet are not separated by physical forces without the adhesive layer and the like interposed between the first sheet and the second sheet. In one embodiment, the second sheet 30 may have a cross cut of about 90% or more, for example, about 90 to 100% to the first sheet 10. Within this range, the composite sheet may have high stability because the second sheet may have high bonding strength to the first sheet.

The second sheet 30 may be any typical resin having a curable functional group, and the resin is not particularly limited provided that it has aforementioned surface energy after curing and aforementioned modulus range when laminated on the first sheet 10. For example, the second sheet may be prepared from acryl resin, and the like.

Hereinafter, referring to FIG. 4, a composite sheet according to still another aspect of the present invention will be described. FIG. 4 is a schematic cross-sectional view of a composite sheet according to still another aspect of the present invention.

Referring to FIG. 4, a composite sheet 400 according to still another aspect of the present invention may comprise a first sheet 10 comprising a matrix 1 and a reinforcing material 5 impregnated in the matrix 1, a second sheet 30 formed on the upper surface of the first sheet 10, and a barrier layer 20 formed on the upper surface of the second sheet 30. A composite sheet according to still another aspect of the invention is the same as the composite sheet according to still another aspect of the invention in FIG. 3 except that the composite sheet further comprises the barrier layer 20. Furthermore, although it is shown in FIG. 4 that one barrier layer is formed on the upper surface of the second sheet, two or more barrier layers may be formed, and may be formed on the lower surface as well as the upper surface of the second sheet.

The barrier layer 20 may be formed on the one side of the second sheet 30, and achieve the effect of maximizing gas barrier property, moisture vapor permeability, mechanical properties, or smoothness of the composite sheet 400. In one embodiment, the barrier layer 20 may comprise at least one of silicon nitride, silicon oxide, silicon carbide, aluminum nitride, indium tin oxide (ITO), or indium zinc oxide (IZO). The barrier layer 20 may have a modulus of about 5 to 20 GPa, and particularly about 10 to 20 GPa, and a thickness of about 5 to 300 nm. Within this range, it is possible to control low surface roughness and efficient moisture vapor permeability without influencing transmittance of the composite sheet.

The barrier layer 20 may be formed on the surface of the second sheet 30 by physical deposition, chemical deposition, coating, sputtering, evaporation, ion plating, wet coating, or organic inorganic multi-layer coating.

Hereinafter, a process of preparing the composite sheet according to one aspect of the present invention will be described.

A process of preparing the composite sheet according to one aspect of the present invention may comprise curing a matrix composition in which a reinforcing material is impregnated, and the curing may comprise at least one of thermal curing and photocuring. The thermal curing may be carried out at about 30 to 100° C. for about 1 to 3 hours, but not limited thereto. The photocuring may be carried out by irradiating at doses of UV wavelength of about 10 to 500 mJ, but not limited thereto.

Hereinafter, a process of preparing the composite sheet according to another aspect of the present invention will be described.

A process of preparing the composite sheet according to another aspect of the present invention may comprise forming a laminate in which the second sheet composition and the base film are sequentially formed on a matrix composition in which a reinforcing material is impregnated, and curing the second sheet composition and the matrix composition, and the matrix composition and the second sheet composition may be in the state not fully cured before the second sheet composition and the matrix composition are cured. The "fully cured" means the state in which 90% or more of the matrix composition and the second sheet composition is cured.

The second sheet composition may be a composition comprising a resin for forming the second sheet, and the resin for forming the second sheet may be coated with any typical solvent, for example, methylethylketone, and the like in dispersion.

The laminate may be formed by coating a composition for matrices on a base film in which the second sheet composition is coated and impregnating the reinforcing material, or alternatively laminating the base film in which the second sheet composition is coated on the matrix in which the reinforcing material is impregnated. The matrix in which the reinforcing material is impregnated may be prepared by coating the matrix composition on the base film and impregnating the reinforcing material, and the second sheet composition and the matrix composition may be in the state not fully cured. Since the second sheet composition and the matrix composition may be simultaneously and later cured in the state not fully cured, it is possible to form stably the second sheet on the matrix with high adhesion.

The base film may serve to maintain stably the second sheet composition, and is not particularly limited provided that it is easily delaminated from the second sheet. For example, the polyester film such as polyethylene terephthalate (PET), and the like may be used as the base film. In addition, the composite sheet may further comprise a primer layer formed on the base film for the easy coating of the second sheet composition, and the primer layer may be prepared from acryl, polyester materials, and the like. The base film may have a thickness of about 10 to 100 μm. Within this range, it is possible to maintain stably the second sheet composition.

The base film in which the second sheet composition is coated may be formed by coating the second sheet composition on the base film, and the second sheet composition may have a coating thickness of about 1 to 10 μm, considering the thickness of the second sheet in the final composite sheet. The coating method is not particularly limited, and may be a spin coating, a die coating, and the like.

The second sheet composition may be partially cured before curing, particularly before contacted with the matrix composition. In this way, it is possible to maintain stably the second sheet composition on the base film, and increase bonding strength between the second sheet and the first sheet, and delaminate the second sheet from the base film subsequently because some curable functional groups remaining in the resin for second sheets may be cured with the curable functional groups contained in the matrix subsequently. Specifically, the second sheet composition may be cured at a curing rate of about 10 to 50%. Within this range, it is possible to maintain stably the second sheet composition on the base film, and increase bonding strength between the first sheet and the second sheet. To this end, it is preferable to carry out the curing at low light intensity, for example, at a UVA wavelength of about 300 mJ or less, for example, about 10 to 300 mJ for about 1 to 60 seconds.

After forming the laminate, the matrix composition and the second sheet composition may be cured. The curing method is not particularly limited, and may be, for example, thermal curing, photocuring, or a combination thereof. The thermal curing may be performed at about 30 to 100° C. for about 1 to 3 hours, but not limited thereto. The photocuring may be performed at about 300 to 1000 mJ for about 10 seconds to 5 minutes.

A process of preparing the composite sheet according to another aspect of the present invention may further comprise delaminating the base film, and the base film may be delaminated via physical method or chemical method to the extent not influencing the physical property of the composite sheet, but not limited thereto.

Hereinabove, although the details of a laminate, in which the second sheet composition and the base film are formed sequentially and formed on one side of the matrix composition with the reinforcing material impregnated are described, it will be equally apply to a laminate, in which the second sheet composition and the base film are formed sequentially and formed on both sides of the matrix composition with the reinforcing material impregnated.

A display apparatus of the present invention may comprise the composite sheet of the present invention. The display apparatus may be, for example, but not limited thereto, flexible liquid crystal display apparatuses, flexible organic lighting device display apparatuses, and the like. The display apparatus may comprise a substrate and an element for apparatuses formed on the substrate, and the element for apparatuses may comprise organic lighting devices, liquid crystals, and the like.

Hereinafter, a display apparatus according to one aspect of the present invention will be described referring to FIG. 5. FIG. 5 is a schematic cross-sectional view of a display apparatus according to one aspect of the present invention.

Referring to FIG. 5, a display apparatus 500 according to one aspect of the present invention may comprise a substrate 110, a buffer layer 25 formed on the upper surface of the substrate 110, a gate electrode 41 formed on the upper surface of the buffer layer 25, and a gate insulator film 40 formed between the gate electrode 41 and the buffer layer 25. An active layer 35 comprising a source and drain region 31, 32, 33 may be formed inside the gate insulator film 40. A interlayer insulator film 51, on which the source and drain electrode 52, 53 may be formed, may be formed on the supper surface of the gate insulator film 40, and a passivation layer 61 comprising contact holes 62, a first electrode 70, and a pixel defined layer 80 may be formed on the supper surface of the interlayer insulator film 51. An organic light emitting layer 71 and a second electrode 72 may be formed on the upper surface of the pixel defined layer 80, and substrate 110 may comprise the composite sheet according to aspects of the present invention.

MODE FOR INVENTION

Now, the present invention will be described in more detail with reference to some examples. However, it should be noted that these examples are provided for illustration only and are not to be construed in any way as limiting the present invention.

Preparation Example 1: Preparation of the Linear Silicone Rubber

A linear silicone rubber was synthesized using phenylmethyldimethoxysilane (PMDMS), dimethyldimethoxysilane (DMDMS) and vinylmethyldimethoxysilane (VMDMS). After weighting PMDMS, DMDMS and VMDMS (PMDMS:DMDMS=3:2 (weight ratio), addition equivalent of VMDMS=0.5 wt % in PMDMS+DMDMS+VMDMS), hydrolysis was performed in deionized water (DIW)/KOH at 70° C. for 1 hour. A polymerization reaction was carried out at 90° C., and toluene and $H_2O$ were added to lower the temperature to 25° C. and flushed with $H_2O$. Thereafter, 1,3-divinyltetramethyldisiloxane (Vi-MM) was added, and subjected to the end capping at 50° C. for 5 hours, and flushed with $H_2O$ at an ambient temperature, and solvent was removed using an evaporator to synthesize a final linear silicone rubber. The synthesized linear silicone rubber was a number average molecular weight (Mn) of 7,000 g/mol.

Preparation Example 2: Preparation of the Linear Silicone Rubber

A linear silicone rubber was prepared by the same method as Preparation Example 1 except that the addition equivalent of VMDMS was changed to 1.0 wt % in PMDMS+DMDMS+VMDMS.

Preparation Example 3: Preparation of the Linear Silicone Rubber

A linear silicone rubber was prepared by the same method as Preparation Example 1 except that the addition equivalent of VMDMS was changed to 2.0 wt % in PMDMS+DMDMS+VMDMS.

Preparation Example 4: Preparation of the Linear Silicone Rubber

A linear silicone rubber was prepared by the same method as Preparation Example 1 except that the addition equivalent of VMDMS was changed to 3.0 wt % in PMDMS+DMDMS+VMDMS.

Preparation Example 5: Preparation of the Linear Silicone Rubber

A linear silicone rubber was prepared by the same method as Preparation Example 1 except that the addition equivalent of VMDMS was changed to 5.0 wt % in PMDMS+DM-DMS+VMDMS.

Example 1

The linear silicone rubber of Preparation Example 1 and a cross-linker (tris(dimethylsiloxy)phenyl silane, purity: 98% or more, JLCHEM Co., Ltd.) were combined such that a mole ratio of functional group A:B=1:1.2, and a Karstedt's catalyst (Umicore) and an inhibitor (Surfynol) were added to prepare a matrix composition. The content of the linear silicone rubber was 96 wt % in the matrix composition. A glass fiber cloth (a refractive index: 1.48, a thermal expansion coefficient: 3 ppm/° C., D-glass cloth, Owens Corning) was impregnated in the matrix composition to be present at an amount of 60 wt % in the composite sheet, and thermally cured at 50° C. for 2 hours to prepare a composite sheet. In the mole ratio of the functional group, A means a mole number of a Si-vinyl group to a weight average molecular weight of the linear silicone rubber, and B means a mole number of a Si—H group to a molecular weight of the cross-linker.

Example 2

The linear silicone rubber of Preparation Example 1, a cross-linker (tris (dimethylsiloxy)phenyl silane, purity: 98% or more, JLCHEM Co., Ltd.), and tetravinyltetramethyl cyclotetrasiloxane (D4vinyl, purity: 95% or more, JLCHEM Co., Ltd.) as a non-rubber silicone compound were combined such that a mole ratio of functional group C:A=5.5:1 and (C+A):B=1:1.2, and a Karstedt's catalyst (Umicore) and an inhibitor (Surfynol) were added to prepare a matrix composition. The content of the linear silicone rubber was 68 wt % in the matrix composition. A glass fiber cloth (a refractive index: 1.48, a thermal expansion coefficient: 3 ppm/° C., D-glass cloth, Owens Corning) was impregnated in the matrix composition, and thermally cured at 50° C. for 2 hours to prepare a composite sheet. In the mole ratio of the functional group, A means a mole number of a Si-vinyl group to a weight average molecular weight of the linear silicone rubber, B means a mole number of a Si—H group to a molecular weight of the cross-linker, and C means a mole number of a Si-vinyl group to a molecular weight of the non-rubber silicone compound.

Example 3

A linear silicone rubber was prepared by the same method as the Example 2 except that the content of the linear silicone rubber was changed to 73 wt % in the matrix composition of C:A=4.1:1.

Example 4

A linear silicone rubber was prepared by the same method as the Example 2 except that the content of the linear silicone rubber was changed to 76 wt % in the matrix composition of C:A=3.3:1.

Example 5

A composite sheet was prepared by the same method as Preparation Example 1 except that the linear silicone rubber in Preparation Example 2 was used instead of the linear silicone rubber in Preparation Example 1.

Example 6

A composite sheet was prepared by the same method as Preparation Example 2 except that the linear silicone rubber in Preparation Example 2 was used instead of the linear silicone rubber in Preparation Example 1.

Example 7

The linear silicone rubber of Preparation Example 2, tris-silane (tris(dimethylsiloxy)phenyl silane, purity: 98% or more, JLCHEM Co., Ltd.) as a cross-linker, and tetravinyltetramethyl cyclotetrasiloxane (D4vinyl, purity: 95% or more, JLCHEM Co., Ltd.) as a non-rubber silicone compound were combined such that a weight ratio ratio is 6:2:1, and an inhibitor (Surfynol) and a Karstedt's catalyst (Umicore) were added in an amount of 1000 ppm and 500 ppm to the linear silicone rubber, respectively, while stirring to prepare a matrix composition. A mixture having a weight ratio of 1:1 of SSH-1001LV (Shin-A T&C) as an acryl resin and MHIC-11 (MNP Co.) was diluted in methyl ethyl ketone (MEK) to the solid content of 50 wt %, and coated on a polyethylene terephthalate (PET, Toray, thickness 38 μm, a product coated with primer) film. After removing the solvent MEK, the acryl resin was partially cured by irradiating UV of 300 mJ (curing rate: 30%). The cured acryl resin had a thickness of 2 to 3 μm. A glass fiber cloth (a refractive index: 1.48, a thermal expansion coefficient: 3 ppm/° C.) was impregnated in the matrix composition. Then, the PET film having one side not having the acryl resin and other side in which the acryl resin was partially cured was applied on the matrix composition, laminated at a pressure of 0.1 MPa, cured at 60° C. for 1 hour, and delaminated both sides of the PET film to prepare a composite sheet comprising a silicone resin layer as a first sheet in which the glass fiber cloth was impregnated and an acryl resin layer as a second sheet formed on the silicone resin layer.

Example 8

A composite sheet was prepared by the same method as the Example 7 except that the PET film in which the acryl resin was partially cured was applied on both sides of the matrix composition in which the glass fiber cloth was impregnated.

Comparative Example 1

A composite sheet was prepared by the same method as the Example 1 except that the linear silicone rubber in Preparation Example 3 was used instead of the linear silicone rubber in Preparation Example 1.

Comparative Example 2

A composite sheet was prepared by the same method as the Example 1 except that the linear silicone rubber in Preparation Example 4 was used instead of the linear silicone rubber in Preparation Example 1.

Comparative Example 3

A composite sheet was prepared by the same method as the Example 1 except that the linear silicone rubber in Preparation Example 5 was used instead of the linear silicone rubber in Preparation Example 1.

Comparative Example 4

A composite sheet was prepared by the same method as the Example 7 except that the first sheet was prepared by curing the matrix composition in which the glass fiber cloth was impregnated and the uncured acryl resin on the prepared first sheet was reimpregnated and cured using the uncoated PET film.

Comparative Example 5

A composite sheet was prepared by the same method as the Example 7 except that the first sheet was prepared by curing the matrix composition in which the glass fiber cloth was impregnated and a corona treatment was performed on the prepared first sheet, and then, the uncured acryl resin on the prepared first sheet was reimpregnated and cured using the uncoated PET film.

Comparative Example 6

A composite sheet was prepared by the same method as the Example 7 except that the first sheet was prepared by curing the matrix composition in which the glass fiber cloth was impregnated and an UV ozone (UVO) treatment was performed on the prepared first sheet, and then, the uncured acryl resin on the prepared first sheet was reimpregnated and cured using the uncoated PET film.

Comparative Example 7

The first sheet was prepared by curing the matrix composition in which the glass fiber cloth was impregnated, and the composite sheet was prepared without further impregnation of the acryl resin.

The physical properties (1) to (4) were determined for the composite sheets of Examples 1 to 6 and Comparative Examples 1 to 3, and the results thereof are shown in Table 1.

(1) Modulus (Relaxation modulus): Modulus was calculated by applying a force of 10 mN to a window portion (a portion consisted of the resin, in which wefts and warps of glass fibers are not cross) of the composite sheet with a micro indenter (Vicker indenter) using a Micro indentation equipment (HM2000, Fisher) for 10 seconds, and creeping for 3 seconds, and relaxing for 10 seconds.

(2) Compressive Elongation: The length (s, unit: μm) in which a micro indenter is indented into the point at which a window portion (a portion consisted of the resin, in which wefts and warps of glass fibers are not cross) breaks is measured when a force of 1000 mN is applied to the window portion of the composite sheet with the micro indenter using a Micro indentation equipment (HM2000, Fisher) at 0.01 mm/sec. Compressive elongation was calculated as a percentage value (s/t×100) of the measured length (s) to the total thickness (t, unit: μm).

(3) Transmittance: The transmittance in the initial state was measured on the composite sheet (thickness: 100 μm) at 25° C. and at a wavelength of 550 nm. After allowing the composite sheet left at 250° C. for 1 hour, the transmittance of the composite sheet was measured at 25° C. and at a wavelength of 550 nm. The transmittance was measured using an UV-Vis Spectrometer (Lambda 35, Perkin Elmer).

(4) Occurrence of Crack: The occurrence of crack in the initial state was determined on the composite sheet at 25° C. using an optical microscope in reflection-mode. After allowing the composite sheet left at 250° C. for 1 hour, the occurrence of crack was determined in the same method as 25° C. If the crack was not occurred in the surface of the composite sheet, it is represented by "X", and if the crack was partially occurred, it is represented by Δ, and if the crack was largely occurred, it is represented by "O".

The tensile elongation of the matrix was determined by curing a matrix composition without impregnating the glass fiber cloth of Examples 1 to 6 and Comparative Examples 1 to 3 to prepare a matrix. The tensile elongation of the matrix was calculated as a percentage of a ratio of the length in which the matrix breaks when stretching the matrix using a TA.XT.plus (TA instrument) at a rate of 50 mm/min to the total length of the matrix specimen (width 5 mm, length 20 mm), and results thereof is shown in Table 1.

TABLE 1

| | Content of VMDMS* (wt %) | Content of silicone rubber** (wt %) | Modulus (MPa) | Compressive elongation (%) | Tensile elongation (%) of matrix | Initial state Transmittance (%) | Crack | After leaving at 250° C. for 1 hour Transmittance (%) | Crack |
|---|---|---|---|---|---|---|---|---|---|
| Ex. 1 | 0.5 | 96 | 5 | 48 | 25 | 88.0 | x | 88.2 | x |
| Ex. 2 | 0.5 | 68 | 10 | 38 | 18 | 88.4 | x | 88.2 | x |
| Ex. 3 | 0.5 | 73 | 7 | 38 | 20 | 87.5 | x | 88.1 | x |
| Ex. 4 | 0.5 | 76 | 6 | 43 | 24 | 87.8 | x | 86.9 | x |
| Ex. 5 | 1.0 | 96 | 5 | 40 | 21 | 86.9 | x | 87.0 | x |
| Ex. 6 | 1.0 | 68 | 5 | 45 | 20 | 88.0 | x | 88.1 | x |
| C.E. 1 | 2.0 | 96 | 7 | 28 | 14 | 87.5 | x | 77.4 | Δ |
| C.E. 2 | 3.0 | 96 | 8 | 21 | 11 | 81.0 | Δ | 53.0 | o |
| C.E. 3 | 5.0 | 96 | 8 | 15 | 8 | 74.1 | o | 49.2 | o |

*Content of VMDMS in the preparation of the linear silicone rubber according to Preparation Examples 1 to 5.
**Content of the linear silicone rubber on the solid contents in the matrix composition.

As shown in Table 1, it is demonstrated that the composite sheet of one aspect of the present invention had a compressive elongation of 30% or more, and did not lead to the crack although allowing it left at 250° C. for 1 hour, and thus maintained a transmittance of 80% or more.

Therefore, the present invention provides a composite sheet without the occurrence of crack or the splitting of the interface between the matrix and the reinforcing material even though allowing it left at a high temperature of about 250° C. or more, and having high flexibility and heat resistance. In addition, the present invention provides a composite sheet having certain modulus such that certain components or layers are not peeled or broke if the components or layers are laminated on the upper surface of the composite sheet.

cut" was calculated as a percentage of a ratio of the sample number remaining the composite sheet after delaminating to the sample number (100) of the acryl resin layer before delaminating.

TABLE 2

| | Acryl resin layer | Surface energy (dyne/cm) | | Modulus (MPa) | | Surface | | |
|---|---|---|---|---|---|---|---|---|
| | thickness (μm) | Acryl resin layer | Silicone resin layer | Acryl resin layer | Silicone resin layer | roughness (nm) | crack | Cross cut (%) |
| Ex. 7 | 3 | 55 | 32 | 400 | 15 | 80 | x | 100 |
| Ex. 8 | 6 | 55 | 32 | 400 | 15 | 80 | x | 100 |
| C.E. 4 | 3 | 55 | 32 | 400 | 15 | 70 | ○ | 0 |
| C.E. 5 | 3 | 55 | 45 | 400 | 15 | 80 | ○ | 30 |
| C.E. 6 | 3 | 55 | 48 | 400 | 15 | 100 | ○ | 40 |
| C.E. 7 | 0 | — | 32 | — | — | 150 | — | — |

However, it is shown that Comparative Examples 1 to 3 having the addition equivalent of VMDMS outside the range of the present invention in the preparation of the linear silicone rubber had a compressive elongation of less than 30%, and led to the partial crack after allowing it left at 250° C. for 1 hour, and thus had a transmittance of less than 80%, and could not achieve the benefit of the present invention.

The physical properties were measured on the composite sheets of Examples 7 to 8 and Comparative Examples 4 to 7, and results thereof are shown in Table 2.

(5) Surface Energy: The contact angle was determined using a Phoenix300 Contact Angle Analyzer from SEO. The surface energy was calculated by applying an "Owens-Wendt-geometric" Method to the contact angle. Specifically, the surface energy was calculated using an Owens-Wendt-geometric equation used in the calculation equation of the surface energy by adding a polar solution (deionized water) and a non-polar solution (diiodomethane) drop-wisely to the acryl resin layer as a second sheet in the composite sheet to be measured in one drop (5 to 8 μl) and measuring the contact angle of the two solvents at an ambient temperature (25° C.) using a contact angle meter. The surface energy was calculated on the silicone resin layer using the same method.

(6) Modulus: Modulus was calculated by applying a force of 10 mN to the acryl resin layer as a second sheet in the composite sheet with a micro indenter (Vicker indenter) using a Micro indentation equipment (HM2000, Fisher) for 10 seconds, and creeping for 3 seconds and relaxing for 10 seconds. Modulus was also calculated on a window portion consisted of silicone resin, in which wefts and warps of glass fibers are not cross, in the silicone resin layer using the same method.

(7) Surface Roughness (Ra): The surface roughness was determined on the surface of the acryl resin layer in the composite sheet using an Optical profiler (ZYGO, 700s).

(8) Occurrence of Crack: The occurrence of crack was determined on the composite sheet at 25° C. using an optical microscope in reflection-mode. If the crack was not occurred in the surface of the composite sheet, it is represented by "X", and if the crack was occurred, it is represented by "0".

(9) Cross Cut: The bonding strength between the silicone resin layer and the acryl resin layer was determined. The acryl resin layer in the composite sheet was cut into the 100 sample having the same size of 1 mm×1 mm (width×length) by dividing the width to ⅟10 and the length to ⅟10 using a cross hatch cutter (YCC-230/1), and the acryl resin layer was delaminated from the silicone resin layer with 3M (810, 18 mm) standard tape at 180° (ASTM D-3359). The "cross As shown in Table 2, it is demonstrated that the composite sheet of one aspect of the present invention had high surface energy and modulus, and low surface roughness, and thus had an effect of laminating certain layers stably to the composite sheet, as well as high cross cut, high bonding strength and high stability between the matrix and the buffer layer, and high stability without the crack.

Therefore, the present invention provides a process of preparing a composite sheet having high surface energy and modulus and improved surface roughness, and thus having an effect of laminating certain layers stably to the composite sheet, as well as high adhesion with the barrier layer, high stability without the crack, high bonding strength and high stability between the matrix and the buffer layer, thus capable of laminating stably the buffer layer with high adhesion.

Meanwhile, the composite sheet of Comparative Examples 4 to 6 led to the occurrence of crack, and had low stability, low cross cut, and low bonding strength and low stability between the matrix and the buffer layer. In addition, the composite sheet of Comparative Example 7 not comprising the acryl resin layer had high surface roughness.

It is shown that the simple modifications or changes of the present invention can be easily practiced by those skilled in the art, and the modifications or changes will be encompassed by the scope of the present invention.

The invention claimed is:
1. A composite sheet comprising:
a first sheet comprising a silicone matrix, and a reinforcing material impregnated in the silicone matrix,
the reinforcing material comprising at least one selected from the group consisting of glass fibers, glass fiber cloths, glass fabrics, glass non-woven cloths, and glass meshes; and
the silicone matrix comprising a cured product of a matrix composition containing a linear silicone rubber, the linear silicone rubber prepared from a composition for preparing silicone rubbers comprising phenylmethyldimethoxysilane, dimethyldimethoxysilane and vinylmethyldimethoxysilane;
wherein the first sheet has a compressive elongation of about 30% or more;
wherein the compressive elongation is the percentage (s/t×100) of an indentation length (s) relative to the total thickness of the first sheet (t) wherein the indentation length is the length in which a micro indenter is indented with a force of 1000 mN/mm² at 0.1 mm/sec into a window portion of the first sheet prior to breaking the silicone matrix of the first sheet, wherein the window portion is a portion of the first sheet between portions of the reinforcing material and consisting of the silicone matrix such that the micro indenter does not cross the reinforcing material while being indented into the window portion.

2. The composite sheet according to claim 1, wherein the first sheet has a transmittance of about 80% or more at a thickness of 100 μm at 25° C. and at a wavelength of 550 nm after being left at 250° C. for 1 hour.

3. The composite sheet according to claim 1, wherein the silicone matrix has a tensile elongation of about 15% or more.

4. The composite sheet according to claim 1, wherein the vinylmethyldimethoxysilane is present in an amount of about 1.0 wt % or less in the composition for preparing silicone rubbers.

5. The composite sheet according to claim 1, wherein the linear silicone rubber comprises a repeat unit of Formula 4:

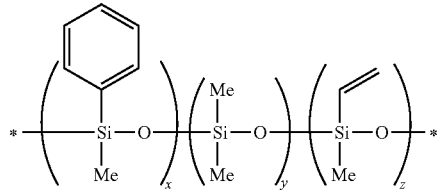

<Formula 4> wherein in Formula 4, * is a linking site of an element, 0<x<1, 0<y<1, 0<z<1, x+y+z=1, and Me is a methyl group.

6. The composite sheet according to claim 1, wherein the first sheet has a relaxation modulus of about 5 to 20 MPa.

7. The composite sheet according to claim 1, wherein the matrix composition further comprises a non-rubber silicone compound.

8. The composite sheet according to claim 7, wherein the non-rubber silicone compound is a cyclic siloxane compound.

9. The composite sheet according to claim 8, wherein the cyclic siloxane compound is represented by Formula 16:

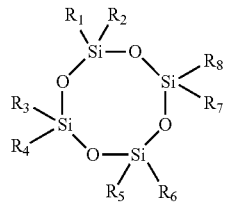

<Formula 16> wherein in Formula 16, $R_1$, $R_2$, $R_3$, $R_4$, $R_5$, $R_6$, $R_7$, and $R_8$ are each independently a $C_1$-$C_{10}$ alkyl group, a $C_6$-$C_{20}$ aryl group, a vinyl group, an allyl group, an allyloxy group, a vinyloxy group, or a group represented by Formula 17,

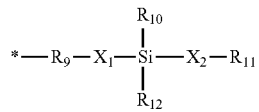

<Formula 17> wherein in Formula 17, * is a linking site to Si in Formula 16, $R_9$ is a $C_1$-$C_{10}$ alkylene group, or a $C_6$-$C_{20}$ arylene group, $R_{10}$, $R_{11}$, and $R_{12}$ are each independently a $C_1$-$C_{10}$ alkyl group, a $C_6$-$C_{20}$ aryl group, a vinyl group, an allyl group, an allyloxy group, or a vinyloxy group, and $X_1$ and $X_2$ are each independently a single bond, O, S, or NR, wherein R is hydrogen or a $C_1$-$C_{10}$ alkyl group, at least one of $R_1$, $R_2$, $R_3$, $R_4$, $R_5$, $R_6$, $R_7$, and $R_8$ is a vinyl group, an allyl group, an allyloxy group, a vinyloxy group, or a group represented by Formula 17 in which at least one of $R_{10}$, $R_{11}$, and $R_{12}$ is a vinyl group, an allyl group, an allyloxy group, or a vinyloxy group.

10. The composite sheet according to claim 7, wherein the linear silicone rubber is present in an amount of about 60 to 80 wt %, and the non-rubber silicone compound is present in an amount of about 1 to 30 wt %, based on the solids content in the matrix composition.

11. The composite sheet according to claim 1, wherein the reinforcing material has a refractive index of about 1.5 or less.

12. The composite sheet according to claim 1, wherein the composite sheet further comprises a barrier layer formed on one or both sides of the first sheet.

13. The composite sheet according to claim 1, comprising a second sheet formed on at least one side of the first sheet.

14. The composite sheet according to claim 13, wherein the second sheet has a surface roughness (Ra) of about 100 nm or less.

15. The composite sheet according to claim 13, wherein if a relaxation modulus of the first sheet is M1, and a relaxation modulus of the second sheet is M2, then M1≤M2.

16. The composite sheet according to claim 13, wherein the first sheet and the second sheet are integral.

17. The composite sheet according to claim 13, wherein the second sheet is a cured product of an acryl resin containing composition.

18. The composite sheet according to claim 13, wherein the composite sheet further comprises a barrier layer formed on one or both sides of the second sheet.

19. A display apparatus comprising:
a substrate, and an element for display apparatuses formed on the substrate,
wherein the substrate comprises the composite sheet according to claim 1.

20. A process of preparing the composite sheet of claim 13, the process comprising:
laminating a base film applied with a second sheet composition on the matrix composition in which the reinforcing material is impregnated, and curing the second sheet composition and the matrix composition,
wherein, prior to the curing, the matrix composition and the second sheet composition are not fully cured.

21. The process according to claim 20, wherein the second sheet composition has a degree of curing of about 10 to 50%.

22. The process according to claim 20, wherein the base film comprises a film with a primer layer formed thereon.

23. The process according to claim 20, wherein the second sheet composition comprises an acryl resin.

* * * * *